(12) United States Patent
Ito et al.

(10) Patent No.: US 9,223,428 B2
(45) Date of Patent: Dec. 29, 2015

(54) TOUCH TYPE INPUT DEVICE

(71) Applicant: KABUSHIKI KAISHA TOKAI RIKA DENKI SEISAKUSHO, Aichi (JP)

(72) Inventors: Ayano Ito, Aichi (JP); Masahisa Doko, Aichi (JP); Satoshi Arikura, Aichi (JP); Yasuhiro Fujioka, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 91 days.

(21) Appl. No.: 14/051,987

(22) Filed: Oct. 11, 2013

(65) Prior Publication Data

US 2014/0118275 A1 May 1, 2014

(30) Foreign Application Priority Data

Oct. 26, 2012 (JP) .................................. 2012-236525
Dec. 25, 2012 (JP) .................................. 2012-281583

(51) Int. Cl.
*G09G 5/00* (2006.01)
*G06F 3/041* (2006.01)
*G06F 3/0488* (2013.01)
*G06F 3/01* (2006.01)

(52) U.S. Cl.
CPC .............. *G06F 3/0412* (2013.01); *G06F 3/017* (2013.01); *G06F 3/04886* (2013.01)

(58) Field of Classification Search
CPC ... G06F 3/03547; G06F 3/017; G06F 3/0481; G06F 3/04892; G06F 3/04812
USPC .......... 345/173–178, 156, 157, 169; 715/702, 715/863; 455/556.1, 556.2, 566
See application file for complete search history.

(56) References Cited

U.S. PATENT DOCUMENTS

| | | | |
|---|---|---|---|
| 6,031,531 A * | 2/2000 | Kimble ......................... | 715/862 |
| 2008/0306683 A1* | 12/2008 | Ando et al. ................... | 701/207 |
| 2010/0169839 A1 | 7/2010 | Yoo et al. | |
| 2010/0309122 A1 | 12/2010 | Abe et al. | |
| 2011/0225492 A1* | 9/2011 | Boettcher et al. ............. | 715/702 |
| 2012/0052918 A1* | 3/2012 | Yang ............................. | 455/566 |
| 2012/0068945 A1* | 3/2012 | Sugeda et al. ................ | 345/173 |

FOREIGN PATENT DOCUMENTS

| | | |
|---|---|---|
| JP | 05-173714 | 7/1993 |
| JP | 10-240447 | 9/1998 |
| JP | 2006-244393 | 9/2006 |
| JP | 2008-257629 | 10/2008 |
| JP | 2009-253773 | 10/2009 |
| JP | 2010-157244 | 7/2010 |
| JP | 2012-068710 | 4/2012 |

OTHER PUBLICATIONS

Japan Office action, mail date is Sep. 9, 2014.

* cited by examiner

*Primary Examiner* — Jennifer Nguyen
(74) *Attorney, Agent, or Firm* — Greenblum & Bernstein, P.L.C.

(57) ABSTRACT

A touch type input device includes a display capable of showing a plurality of icons. A detector detects touching of an operation surface. A controller moves operational coordinates on the display based on the detection of the detector. The controller selects one of the icons in accordance with a region in which the operational coordinates are located. Further, the controller moves the operational coordinates to a specified position in the region where the operational coordinates are located when a touch-release operation is performed indicating that the touching of the operation surface has been cancelled.

5 Claims, 5 Drawing Sheets

☐ : Selected Icon
▨ : Target Icon
○ : Icon Center

TOUCH TYPE INPUT DEVICE

CROSS-REFERENCE TO RELATED APPLICATIONS

This application is based upon and claims the benefit of priority from prior Japanese Patent Application Nos. 2012-236525, filed on Oct. 26, 2012, and 2012-281583, filed on Dec. 25, 2012, the entire contents of which are incorporated herein by reference.

FIELD

The present invention relates to a touch type input device.

BACKGROUND

Japanese Laid-Open Patent Publication No. 2009-253773 describes a prior art example of a touch type input device. The touch type input device detects when a touchpad is touched (swiped) to select an icon shown on a display.

For example, referring to FIG. 8, icons 101a to 101f are shown on a display 100. In FIG. 8, the cross in the display 100 shows operational coordinates 105 corresponding to a location in a touchpad where the touchpad is touched. The swiping of the touchpad moves the operational coordinates 105 along the display 100. This allows for the selection of the icons 101a to 101f in correspondence with where the operational coordinates 105 are moved.

The operational coordinates 105 moved by the swiping stops at where the finger is separated from the touchpad. Thus, to select an icon arranged next to where the operational coordinates 105 were located when the swiping was stopped, the touchpad is swiped again from the stopped position. In this case, the swiping distance differs in accordance with where the operational coordinates 105 were located when the swiping was stopped. For example, as illustrated in FIG. 8, to switch the selected icon from icon 101a to icon 101f, the touchpad is swiped by distance D1 when the coordinates 105 are located at position P1. When the operational coordinates 105 are located at position P2, the touchpad is swiped by distance D2, which is longer than distance D1. When the operational coordinates 105 are located at position P3, the touchpad is swiped by distance D3, which is longer than distance D2. In this manner, such difference in the distance swiped to switch the selected icon may be uncomfortable to a user.

SUMMARY

One aspect of the present invention is a touch type input device including a display capable of showing a plurality of icons. A detector detects touching of an operation surface. A controller moves operational coordinates on the display based on the detection of the detector. The controller selects one of the icons in accordance with a region in which the operational coordinates are located. The controller moves the operational coordinates to a specified position in the region where the operational coordinates are located when a touch-release operation is performed indicating that the touching of the operation surface has been cancelled.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DESCRIPTION OF THE EMBODIMENTS

A first embodiment of a touch type input device will now be described with reference to FIGS. 1 to 5.

Figure 1:
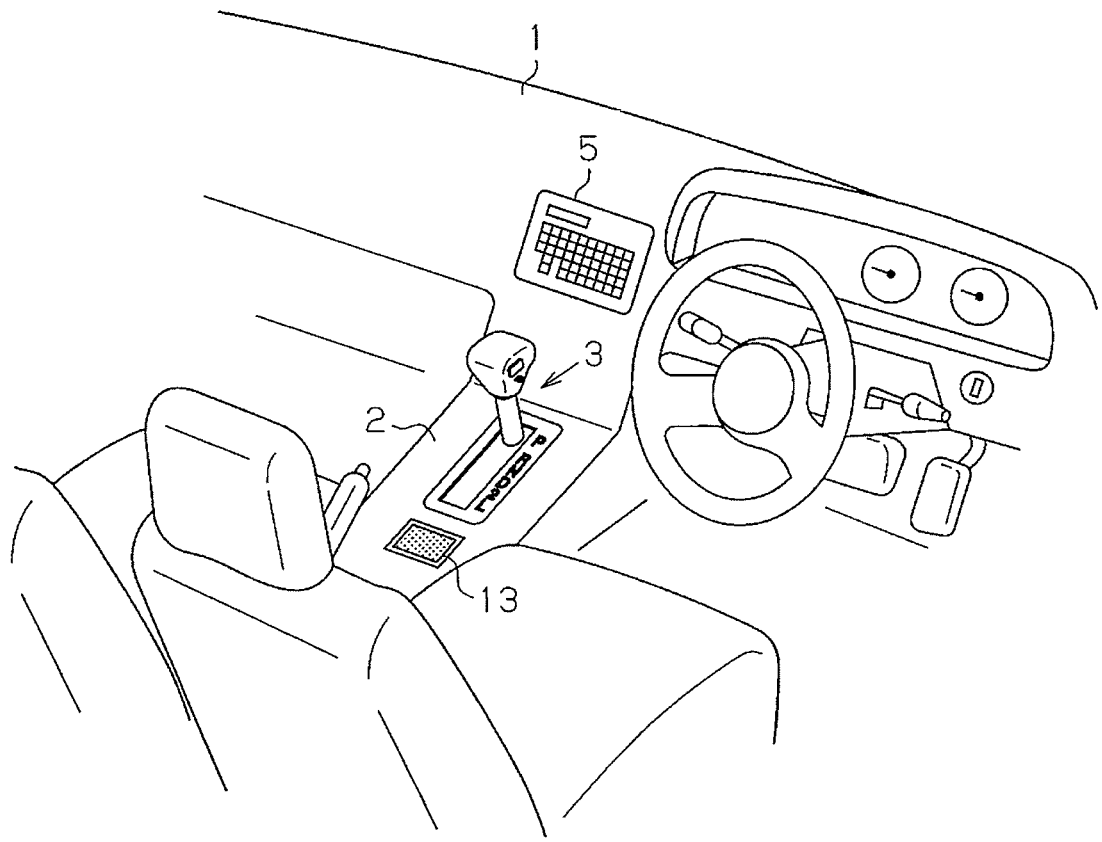
FIG. 1 is a perspective view illustrating an example of a touchpad and a display installed in a vehicle.

Referring to FIG. 1, a display 5 is fitted into a central portion (center console) of a dashboard 1. A shift lever 3 is arranged on the center console 2. A touchpad 13 is arranged near the shift lever 3. The touchpad 13 includes an exposed surface defining an operation surface.

A user touches (swipes) the touchpad 13 to select icons shown on the display 5 and make decisions. This allows for in-vehicle devices, such as a car navigation system, to be operated.

Figure 2:
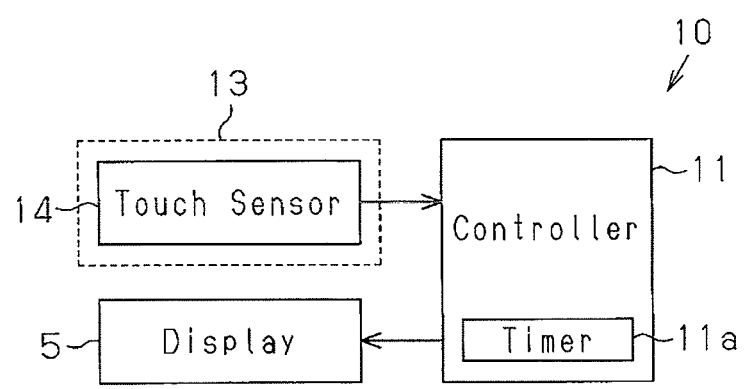
FIG. 2 is a schematic block diagram illustrating a first embodiment of a touch type input device.

Referring to FIG. 2, a touch type input device 10 includes the display 5, the touchpad 13, and a controller 11.

The touchpad 13 incorporates a touch sensor 14. The touch sensor 14 detects changes in the electrostatic capacitance when a finger contacts the touchpad 13, and outputs the detection result to the controller 11. The touch sensor 14 is one example of a detector.

Figure 3:
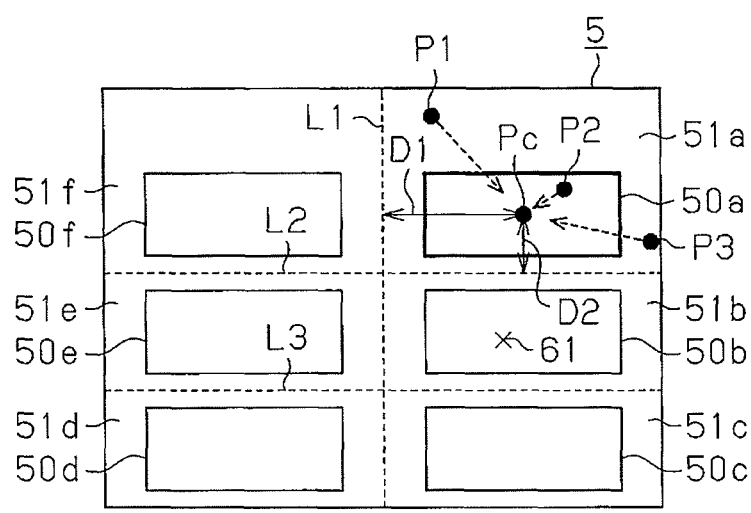
FIG. 3 is a schematic front view illustrating the display for the touch type input device of FIG. 2.
Figure 4:
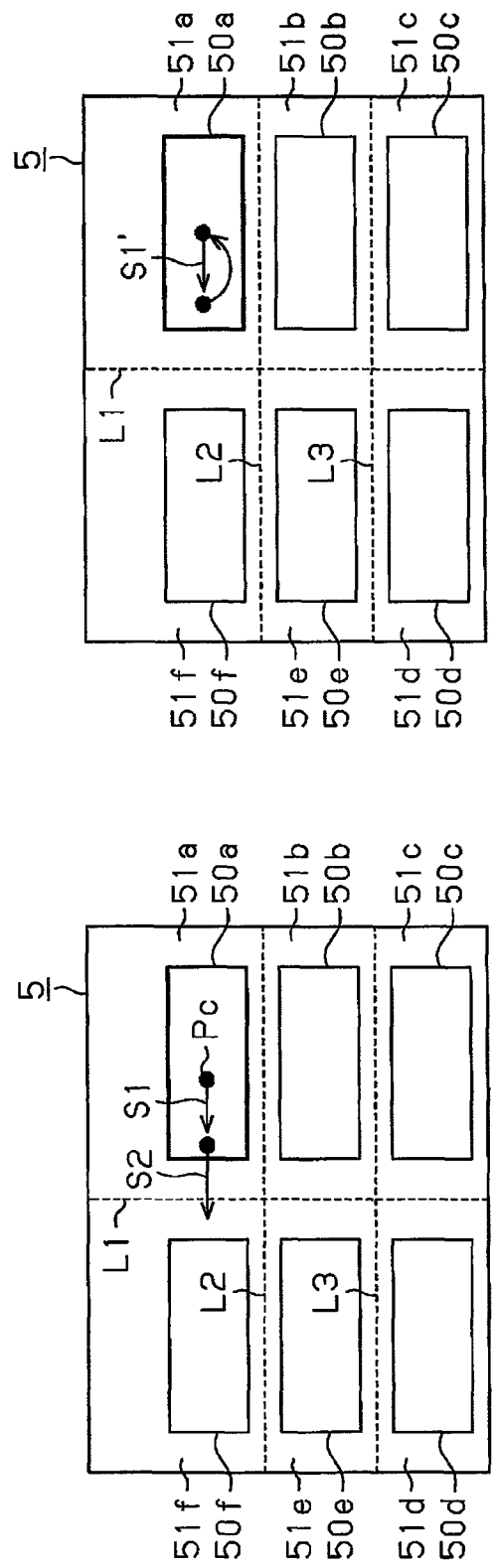
FIG. 4A is a front view of the display illustrated in FIG. 3 when operational coordinates are moved to the center of an icon after waiting for a fixed time.
FIG. 4B is a front view of the display illustrated in FIG. 3 when operational coordinates are moved to the center of an icon without waiting for a fixed time.

The controller 11 includes a timer 11a that measures time. The controller 11 controls the display 5. Referring to FIG. 3, the controller 11 shows, for example, icons 50a to 50f on the display 5.

The controller 11 moves operational coordinates 61, which are indicated by the cross in FIG. 3, on the display 5 based on the detection result from the touch sensor 14. The controller 11 is capable of moving the operational coordinates 61 in accordance with the direction and distance the touchpad 13 is swiped.

Hypothetical boundary lines L1 to L3, which are indicated by broken lines in FIG. 3, are drawn between the icons 50a to 50f. The boundary lines L1 to L3 partitions the display 5 into regions 51a to 51f corresponding to the icons 50a to 50f, respectively. The controller 11 determines which one of the regions 51a to 51f the operational coordinates 61 are located in and selects the one of the icons 50a to 50f corresponding to the region where the operational coordinates 61 are located.

The controller 11 determines whether or not a touch-release operation has been performed based on the detection result of the touch sensor 14. The touch-release operation is performed by separating a finger from the touchpad 13, that is, by cancelling the touching of the touchpad 13. After the timer 11a measures a fixed time T1 from when the controller 11 determines that a touch-release operation has been performed, the controller 11 moves the operational coordinates 61 to the center Pc of the selected icon (in FIG. 3, icon 50a). Further, the controller 11 continues to keep the icon selected even after the touch-release operation. In this manner, one of the icons is always selected regardless of where the operational coordinates 61 are located on the display 5. The operational coordinates 61 are not shown on the display 5.

For example, as illustrated in FIG. 3, when the operational coordinates 61 are located at position P1 in region 51a when a touch-release operation is performed, the operational coordinates 61 move to the center Pc of the icon 50a after the fixed time T1 elapses. In the same manner, when the operational coordinates 61 are located at position P2 in region 51a when a touch-release operation is performed, the operational coordinates 61 move to the center Pc of the icon 50a after the fixed time T1 elapses. By moving the operational coordinates 61 to the center Pc of the icon 50a in such a manner, the swiping distance D1 is always constant when switching the selected icon to, for example, icon 50f. In the same manner, the swiping distance D2 is always constant when switching the selected icon to, for example, icon 50b.

The fixed time T1 is set to be within a time during which successive swiping operations may be expected to be performed. Successive swiping operations refer to the repetition of swiping operations and touch-release operations performed within a short period of time to switch the selected icon. For example, as illustrated in FIG. 4A, to switch the selected icon from icon 50a to icon 50f, successive swiping operations may be performed (e.g., two successive swiping operations S1 and S2). In this case, after the first swiping operation (and touch-release operation), the operational coordinates 61 are not moved to the center Pc until the fixed time T1 elapses. Thus, even when a touch-release operation is performed after a first swiping operation, a second swiping operation may be successively performed to switch the selected ion from icon 50a to icon 50f. When not waiting for the fixed time T1 to elapse, as illustrated in FIG. 4B, after the first swiping operation S1, the operational coordinates 61 are immediately returned to the center Pc of the icon 50a. This may make it difficult to switch the selected icon through successive swipes.

Figure 5:
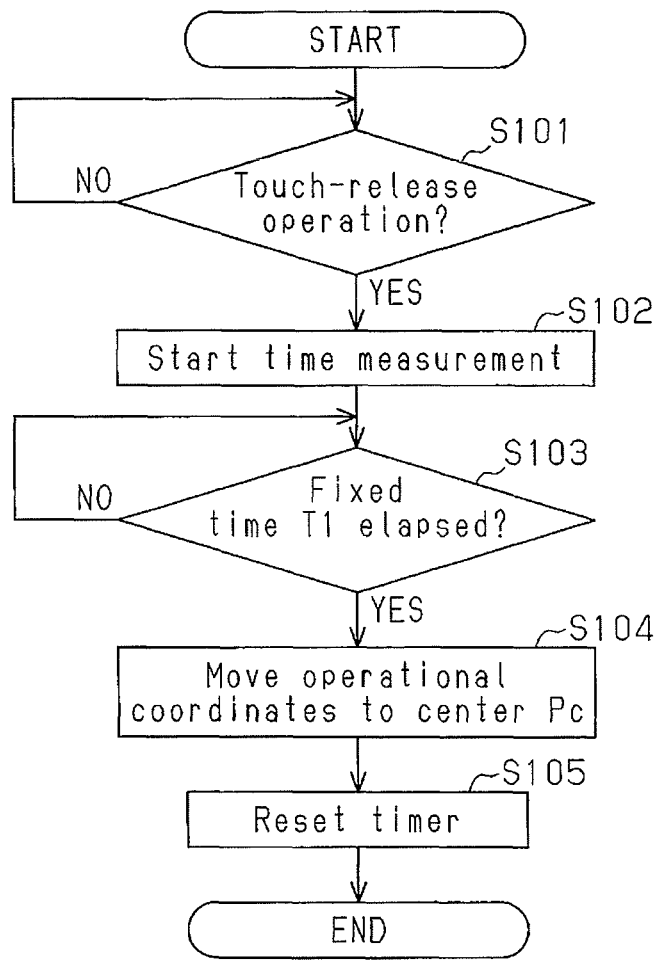
FIG. 5 is a schematic flowchart of a process performed by a controller illustrated in FIG. 2.

The process performed by controller 11 will now be performed with reference to the flowchart of FIG. 5. The process of the flowchart is repetitively performed.

The controller 11 determines whether or not a touch-release operation has been performed (S101). When a touch-release operation has been performed (YES in S101), the controller 11 starts to measure time with the timer 11a (S102).

Then, the controller 11 determines whether or not the measured time has reached the fixed time T1 (S103). When the measured time reaches the fixed time T1 (YES in S103), the controller 11 moves the operational coordinates 61 to the center Pc of the presently selected icon (S104). Then, the controller 11 resets the timer 11a.

The first embodiment has the advantages described below.

(1) When a touch-release operation is performed indicating that fingers have been separated from the touchpad 13, the controller 11 moves the operational coordinates 61 to a specified position in the region where the operational coordinates 61 are located. For example, the specified position is the center Pc of the icon corresponding to the region in which the operational coordinates 61 are located. Thus, the swiping distance from the center Pc of the presently selected icon is constant when the user switches the selected icon. This improves the operability of the touch type input device 10.

(2) When the fixed time T1 elapses after a touch-release operation is performed, the controller 11 moves the operational coordinates 61 to the center Pc of the selected icon. Thus, when successive swiping operations are performed, the operational coordinates 61 are not returned to the center Pc each time a swiping operation ends. Accordingly, the selected icon may be smoothly switched. This further improves the operability of the touch type input device 10.

(3) The operational coordinates 61 are moved to the center Pc of the selected icon when the fixed time T1 elapses after a touch-release operation is performed. Thus, the operational coordinates 61 are not stopped near the boundary lines L1 to L3 that partition the regions 51a to 51f. Further, since the operational coordinates 61 are moved to the center Pc of the selected icon, the operational coordinates 61 do not move across the boundary lines L1 to L3 when the user does not intend to do so. This avoids undesirable switching of selected icons.

A second embodiment of a touch type input device will now be described with reference to FIGS. 6 and 7. The following description focuses on differences from the first embodiment.

If the selected icon is switched during a period between when a touch-initiating operation is performed to when a touch-release operation is performed, the controller 11 moves the operational coordinates 61 to the center Pc of the selected icon at the same time as when the touch-release operation is performed.

Figure 6:
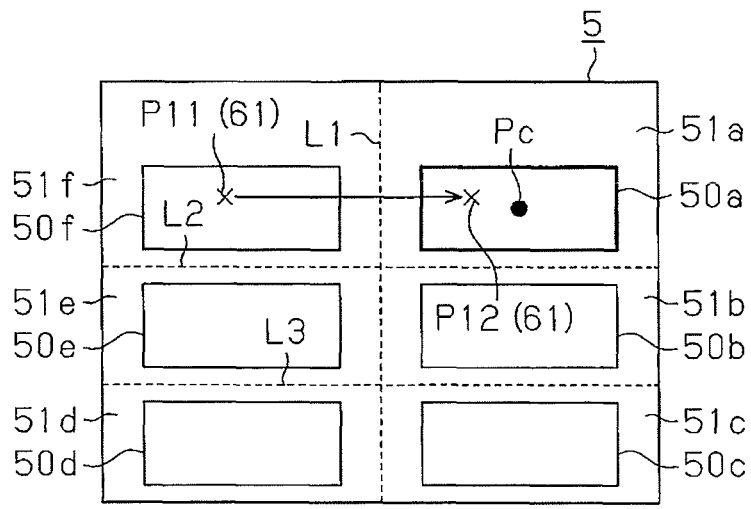
FIG. 6 is a schematic front view illustrating a display in a second embodiment.

For example, referring to FIG. 6, the operational coordinates 61 may be located at position P11 in icon 50f when a user performs a touch-initiating operation, which indicates that the touching of the touchpad 13 has been initiated. In this case, the touchpad 13 may then be swiped to move the operational coordinates 61 from position P11 to position P12, which is in icon 50a. When the user performs a touch-release operation on the touchpad 13 by releasing his or her finger from position P12, the operational coordinates 61 are simultaneously moved to the center Pc of the icon 50a.

Figure 7A:
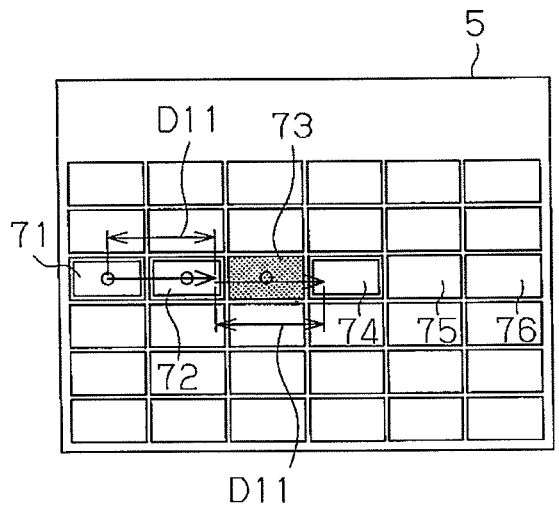
FIG. 7A is a front view of the display illustrated in FIG. 6 when operational coordinates are moved to the center of an icon after waiting for a fixed time from when a touch-release operation is performed.
Figure 7B:
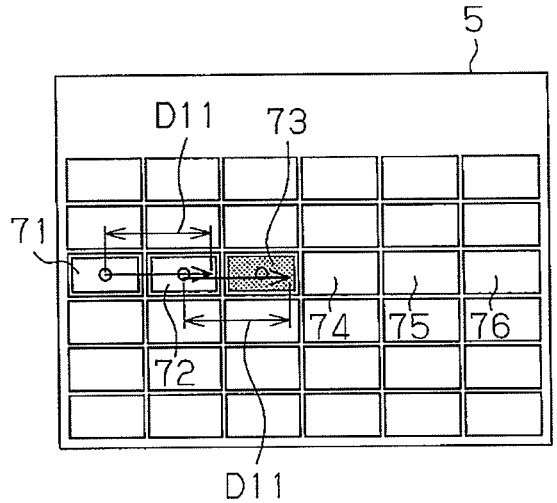
FIG. 7B is a front view of the display illustrated in FIG. 6 when moving operational coordinates to the center of an icon at the same time as when a touch-release operation is performed.
Figure 8:
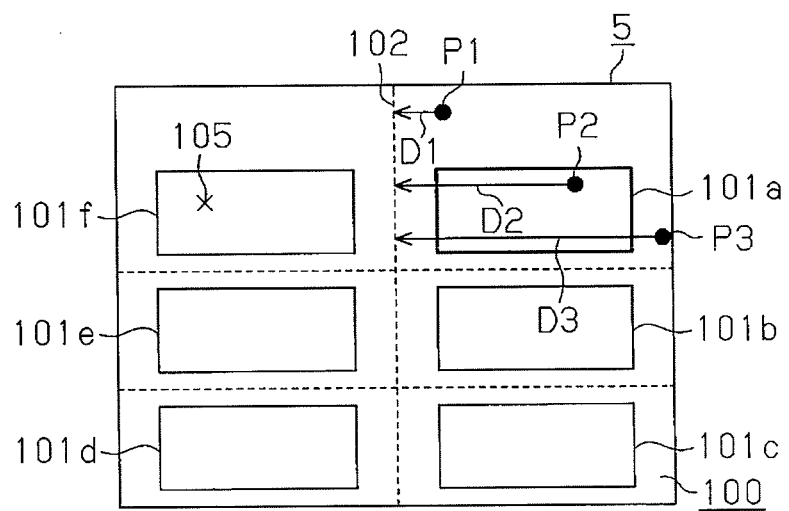
FIG. 8 is a schematic front view illustrating a display of a touch type input device in the prior art.

FIGS. 7A and 7B illustrates an example of the display 5 including icons 71 to 76. When sequentially switching the selected icons in the order of icons 71 to 76, successive swiping operations may be performed at constant swiping distances D11 without waiting for the fixed time T1 to elapse. FIG. 7A illustrates a case in which the control of the first embodiment is executed, and FIG. 7B illustrates a case in which the control of the second embodiment is executed. In both FIGS. 7A and 7B, the first swiping operation is performed over distance D11 to switch the selected icon from icon 71 to icon 72.

However, referring to FIG. 7A, in the control of the first embodiment, when a second swiping operation is successively performed over the same distance D11, the operational coordinates 61 are moved from icon 72 (location of first touch-release operation) to icon 74 skipping icon 73. Accordingly, the selected icon is not switched to icon 73, which is the target of selection, and icon 74 is selected instead.

Referring to FIG. 7B, in the control of the second embodiment, the operational coordinates 61 are moved to the center Pc of icon 72 after the first swiping operation. Thus, even when the second swiping operation is successively performed over the same distance D11, the operational coordinates 61 move from the center Pc of icon 72. Thus, the operational coordinates 61 do not reach icon 74 and move to icon 73. Accordingly, when swiping operations are successively performed over the same distance D11, the selected icon may be correctly switched from icon 72 to icon 73, which is the target of selection.

The second embodiment has the advantages described below.

(4) When the selected icon is switched among icons 50a to 50f between a touch-initiating operation and a touch-release operation, the operational coordinates 61 are moved to the center Pc of the selected icon at the same time as when the touch-release operation is performed. Thus, when the selected icon is switched, the next swiping operation may be performed from the center Pc of the selected icon even before the fixed time T1 elapses from when a touch-release operation is performed. As a result, when successively switching the selected icons, swiping operations are performed over the same swiping distance. This improves the operability of the touch type input device 10.

(5) When the selected icon is not switched between a touch-initiating operation and a touch-release operation, the advantages of the first embodiment are obtained.

It should be apparent to those skilled in the art that the present invention may be embodied in many other specific forms without departing from the spirit or scope of the invention. Particularly, it should be understood that the present invention may be embodied in the following forms.

In the first embodiment, when the fixed time T1 elapses after a touch-release operation, the operational coordinates 61 are moved to the center Pc of the selected icon. However, the location (specified position) to where the operational coordinates 61 are moved may be anywhere in the region were the operational coordinates 61 are located when the touch-release operation is performed. In this case, the operational coordinates 61 are located at the same position (specified position) when a swiping operation is performed again. Thus, the swiping distance is constant when switching the selected icon. The same applies to the second embodiment. More specifically, when the selected icon is switched during a period between a touch-initiating operation and a touch-release operation, the operational coordinates 61 may be moved to a specified position other than the center Pc of the selected icon at the same time as when a touch-release operation is performed.

In the first embodiment, when the first time T1 elapses after a touch-release operation, the operational coordinates 61 are moved to the center Pc of the selected icon (icon in the region where the present operational coordinates 61 are located). However, if the operational coordinates 61 are not located in any of the regions 51a to 51f (i.e., none of the icons 50a to 50f are selected) when a touch-release operation is performed, the operational coordinates 61 may be moved to the center Pc of the closest icon when a touch-release operation is performed. In this manner, the specified position to where the operational coordinates 61 are moved may be the center of the selected icon when a touch-release operation is performed or the center of the icon closest to the operational coordinates 61 when a touch-release operation is performed. The same applies to the second embodiment.

In the first embodiment, when the fixed time T1 elapses after a touch-release operation, the location of the operational coordinates 61 moves to the center of the selected icon. Instead, the operational coordinates 61 may immediately be moved to the center Pc of the selected icon without waiting for the fixed time T1 to elapse. This also allows the selected icon to be switched after a touch-release operation by swiping the touchpad 13 over a distance that is always constant.

In each of the above embodiments, the icons 50a to 50f and the respective regions 51a to 51f may span over the same areas.

The location of the touchpad 13 is not limited to that of the above embodiments. For example, the touchpad 13 may be arranged on the steering wheel or the dashboard 1.

The touch type input device 10 of each of the above embodiments may be applied to an electric device other than a vehicle.

In each of the above embodiments, the touch sensor 14 is of an electrostatic capacitance type. Instead, the touch sensor 14 may be of a resistive film type, a surface acoustic wave type, an infrared type, or an electromagnetic induction type.

In each of the above embodiments, the type, number, and shape of the icons 50a to 50f are not limited.

In each of the above embodiments, the operational coordinates 61 are not shown on the display 5. However, the operational coordinates 61 may be shown as a pointer on the display 5.

In each of the above embodiments, the concept of an icon includes a button, a list, and a scroll bar.

The present examples and embodiments are to be considered as illustrative and not restrictive, and the invention is not to be limited to the details given herein, but may be modified within the scope and equivalence of the appended claims.

The invention claimed is:

1. A touch type input device, comprising:
a display capable of showing a plurality of icons;
a detector that detects touching of an operation surface; and
a controller that moves operational coordinates on the display based on the detection of the detector, wherein the controller selects one of the icons in accordance with a region in which the operational coordinates are located, wherein the controller moves the operational coordinates to a specified position in the region where the operational coordinates are located when a fixed time elapses after a touch-release operation is determined indicating that the touching of the operation surface has been cancelled, and
the fixed time allows for a plurality of swiping operations to be performed as successive swiping operations.

2. The touch type input device according to claim 1, wherein the specified position is a center of an icon that is selected when the touch-release operation is performed or a center of an icon that is closest to the operational coordinates when the touch-release operation is performed.

3. The touch type input device according to claim 1, wherein when the controller determines that a selected icon has been switched during a period from when the touching of the operation surface is started to when the touch-release operation is performed, the controller moves the operational coordinates to the specified position simultaneously with when the touch-release operation is performed.

4. The touch type input device according to claim 1, further comprising a touchpad arranged separately from the display, wherein the operation surface is arranged on the touchpad.

5. A vehicle comprising the touch type input device according to claim 1.

* * * * *